UNITED STATES PATENT OFFICE.

GEORGE P. BROWN, OF BALTIMORE, MARYLAND.

IMPROVEMENT IN MEDICATED CANDIES.

Specification forming part of Letters Patent No. 214,359, dated April 15, 1879; application filed January 28, 1879.

*To all whom it may concern:*

Be it known that I, GEORGE P. BROWN, of Baltimore city, State of Maryland, have invented certain new and useful Improvements in Candy or Bonbons; and I hereby declare the same to be fully, clearly, and exactly described as follows:

My said invention consists, broadly, in candy containing as an ingredient infusion of malt, and specifically in the composition of matter hereinafter described.

The medicinal properties of malt extracts are too well known to render it either necessary or desirable that I here set them forth, and their recognition has led to the preparation of numerous compositions for its exhibition. As a rule, however, they are not palatable, especially to persons not fond of malt liquors.

Candies prepared according to my invention are agreeable to the taste, and the specific preparation I use is an excellent remedy for coughs, colds, hoarseness, and similar affections.

In preparing the candy I proceed as follows: Two pounds of brewers' malt are macerated in about one and a half quart of water, which is then reduced, by evaporation, to about one pint, when it will be of a sirupy consistence. A decoction is then made of four ounces of licorice-root, and another of two ounces of slippery-elm. To the whole are then added five pounds of sugar, and the mixture is boiled until upon cooling it will solidify after the manner of ordinary candy. Finally it is formed into blocks, sticks, or other desired shapes.

Should it be desired, vanilla or other flavoring extract may be added.

What I claim as new, and desire to secure by Letters Patent, is—

1. Candy or bonbons containing as an ingredient infusion of malt, substantially as described.

2. The composition for candy or bonbons herein described, consisting of an infusion of malt, licorice-root, slippery-elm, and sugar, substantially as described.

GEORGE P. BROWN.

Witnesses:
R. D. WILLIAMS,
E. G. ALLEN.